United States Patent Office 3,558,516
Patented Jan. 26, 1971

3,558,516
CHOLESTEROL DETERMINATION REAGENT OF FERRIC PERCHLORATE, SULFURIC ACID AND ETHYL ACETATE
Donald R. Wybenga, Alhambra, Calif., assignor to The Dow Chemical Company, Midland, Mich., a corporation of Delaware
No Drawing. Filed May 8, 1968, Ser. No. 727,700
Int. Cl. G01n *33/16*
U.S. Cl. 252—408    11 Claims

ABSTRACT OF THE DISCLOSURE

A stable reagent for the determination of cholesterol in biological fluids is prepared by dissolving ferric perchlorate in a mixture of an ester solvent, preferably ethyl acetate, and sulfuric acid. The reagent has improved stability and specificity properties. Methods of preparing the reagent and using it in the determination of cholesterol are disclosed.

BACKGROUND OF THE INVENTION (1) Field of the invention

Numerous reagents have been employed in methods for the determination of cholesterol in biological fluids such as serum or plasma or the like. In all of these methods, the amount of cholesterol in a sample of a biological fluid is normally determined by contacting the biological fluid with a reagent which combines with cholesterol in the fluid to form a colored reaction product. The reagent is mixed with the fluid in such a way that the depth or intensity of color produced is proportional to the amount of cholesterol present in the sample of biological fluid. The concentration of cholesterol in the sample is then determined by measuring the depth or intensity of color, usually with a colorimeter or a spectrophotometer. By use of conversion charts or comparisons to standard solutions, the measurement of the color produced by the use of the reagent can be converted to give the concentration of cholesterol in the sample.

(2) Description of the prior art

Among the most widely accepted methods typical of the prior art determinations is the method of Abell et al., J. Biol. Chem., 195, 357 (1952). In the method of Abell et al., the serum sample is first treated with alcoholic potassium hydroxide to liberate cholesterol from lipoprotein complexes and saponify cholesterol esters. The sample is then extracted with a predetermined volume of petroleum ether. The ether extract is evaporated and the residue is then treated with a reagent comprising sulfuric acid, glacial acetic acid and acetic anhydride to form a colored product. The intensity of color produced is then measured in a colorimeter or spectrophotometer to give a value which is proportional to the concentration of cholesterol in the sample.

The saponification and extraction steps make this procedure lengthy and time-consuming. Direct methods employing the same reagent have reduced the time required for analysis, but have necessitated a correction of the results obtained to account for interference caused by the presence of bilirubin in the sample. The correction depends on the amount of bilirubin present in the sample. Also, the reagent employed is not stable in storage; thus, frequent preparation of fresh reagent has been necessary.

Various direct methods have employed a reagent comprising p-toluenesulfonic acid, acetic anhydride, glacial acetic acid and sulfuric acid. See, for example, Van Boetzelaar and Zondag, Clin. Chim. Acta, 5, 943 (1960).

The methods employing p-toluenesulfonic acid have required corrections for bilirubin. Other reagents have been employed, including a mixture of ferric chloride, sulfuric acid and glacial acetic acid as described by Zlatkis et al., J. Lab. Clin. Med., 41, 486 (1953) and Furst et al., Scand. J. Clin. Lab. Invest., 6, 60 (1954).

None of the prior art reagents or methods has been entirely satisfactory in every respect. It would be desirable to provide a single reagent which is stable during extended periods of storage and which can thus be prepared in large quantities long before use, with the consequent ease in measuring ingredients. It would be desirable that the reagent also be specific for cholesterol so that other substances present in the sample such as bilirubin, hemoglobin or gamma globulin will not produce color which interferes with the color developed from the combination of cholesterol with the reagent. It would also be desirable that the reagent form a colored product with both free cholesterol and cholesterol esters so that the quantitative determinations of total cholesterol are consistent with those obtained by the methods involving saponification and extraction. There is also a need for a reagent and simple method which give quick, accurate and yet inexpensive determinations of total cholesterol in biological fluids.

SUMMARY OF THE INVENTION

This invention is directed to a novel single stable reagent for the determination of cholesterol in biological fluids and to methods for preparing and using the same.

It is an object of this invention to provide a single stable reagent for the determination of cholesterol in biological fluids such as serum or plasma or the like which can be prepared well in advance of its use and which remains stable for long periods of time without the use of special storage conditions. Another object of this invention is to provide a reagent and method which produces a specific measurable color from cholesterol so that the color measurement can be made without interference by color due to the presence of other substances such as bilirubin, hemoglobin and the like. Another object is to provide a reagent and method which will reduce the time required for determining the concentration of cholesterol in a sample. A further object is to provide a reagent and method which produces a measurable color with both free cholesterol and cholesterol esters so that the quantitative result obtained are comparable to those obtained by prior art methods involving saponification and extraction of the biological fluid sample. Other objects and advantages of the present invention will be apparent on consideration of the following description and claims.

The reagent for use in the determination of serum cholesterol in accordance with the invention comprises a mixture of ferric perchlorate, sulfuric acid and an ester solvent selected from the lower alkyl esters of lower alkanoic acids. More particularly, the reagent comprises a colorimetric amount of ferric perchlorate dispersed in a mixture of sulfuric acid and ester solvent. The sulfuric acid can be present in the mixture in amounts from about 10, to about 30, to about 50 percent by volume and the ester solvent can be present in amounts from about 50, to about 70, to about 90 percent by volume. In the present specification and claims, the terms "lower alkyl" and "lower alkanoic" are employed to designate lower alkyl and lower alkanoyl of from 1, to 2, to 3, to 4, to 5 carbon atoms, inclusive. Thus, the ester solvent can be an ester of methanol, ethanol, propanol, isopropanol, butanol, isobutanol, amyl alcohol or isoamyl alcohol with formic, acetic, propionic, isobutyric, butyric or valeric acid. Representative ester solvents thus include methyl formate, methyl acetate, methyl propionate, methyl butyrate, methyl isobutyrate, ethyl formate, ethyl acetate, ethyl propionate, ethyl butyrate, ethyl isobutyrate, propyl formate, propyl acetate, isopropyl acetate, butyl formate, isobutyl formate, butyl acetate, isobutyl acetate, sec-butyl acetate, tert-butyl acetate, butyl propionate, isobutyl propionate, pentyl formate, pentyl acetate, isopentyl acetate, pentyl propionate, isopentyl propionate, pentyl butyrate, isopentyl butyrate and isopentyl isobutyrate. A preferred group of ester solvents comprises methyl formate, methyl propionate, ethyl acetate, ethyl propionate, ethyl butyrate, propyl acetate, isopropyl acetate, butyl acetate and isopentyl acetate. Another preferred group of ester solvents are the lower alkyl esters of acetic acid and the ester solvent of choice is ethyl acetate.

The novel reagent composition forms a colored product when mixed with free cholesterol or cholesterol esters. The ingredients of the reagent composition cooperate to disperse cholesterol contained in a sample throughout the reagent composition and to facilitate the formation of the colored product. Thus, the reagent composition can be employed to determine the presence or absence of free or esterified cholesterol in biological fluids. Since a colored product is formed whether or not the cholesterol is in free or esterified form, the term "cholesterol" will be employed generically to include cholesterol esters such as the fatty acid esters, including the acetate, palmitate, stearate and oleate esters as well as free cholesterol.

The intensity of the color formed by admixture of the reagent composition of the invention with cholesterol or a biological fluid containing the same is proportional to the amount of cholesterol present. Thus, the color can be measured to give an accurate, rapid quantitative measurement of cholesterol, without substantial interference by colors due to the presence of substances such as bilirubin, hemoglobin or gamma globulin. Moreover, the novel reagent composition is stable in storage for long periods of time without special storage precautions. Use of the color reagent to determine concentrations of cholesterol gives accurate results which are comparable to those obtained with methods requiring substantially more time for analysis and requiring additional analytical procedures such as saponification and extraction of the sample.

In preparing the reagent of the invention, the ferric perchlorate is dissolved in the ester solvent in any order or fashion, and concentrated sulfuric acid is then mixed with the resulting solution. It is preferred that the ester solvent and the concentrated sulfuric acid both be reagent grade materials. The ferric perchlorate need not be of reagent grade; however, a non-yellow ferric perchlorate containing no more than about 0.05 percent by weight of impurities as insolubles, chloride and sulfate, should be employed. Minor amounts of water or perchloric acid associated with the ferric perchlorate compositions employed do not alter the desirable properties of the reagent. The non-yellow ferric perchlorate employed can thus include perchloric acid and water, so long as the ferric perchlorate composition contains less than about 0.05 percent by weight of the described impurities. For example, the ferric perchlorate composition can contain from about 20 to about 50 percent by weight of perchloric acid and water. When such compositions are employed, the ferric perchlorate content of the particular composition employed should be taken into account in measuring ingredients and formulating the reagent.

In a convenient procedure, a non-yellow ferric perchlorate composition of requisite purity is mixed with ethyl acetate at temperatures from about 20° to about 30° C. The sulfuric acid is thereafter mixed with the ferric perchlorate solution. In the preferred procedure, the sulfuric acid is added portionwise with stirring or agitation and the mixture is cooled in an ice bath during and after each addition. The reagent thus prepared has been found to be stable for periods of nine months when stored at room temperature in glass bottles. Refrigeration of the reagent prolongs the stability of the reagent well beyond nine months.

The presence of a colorimetric amount of ferric perchlorate in the reagent composition is critical and essential to the use of the composition in cholesterol determination. Sufficient ferric perchlorate must be present in the ultimate reagent composition so that a measurable color is produced by the combination of ferric perchlorate and cholesterol when the reagent composition is mixed with cholesterol. In the present specification and claims, the phrase "colorimetric amount" is employed to designate that concentration of ferric perchlorate in the composition which produces a measurable color with cholesterol. The particular colorimetric amount of ferric perchlorate to be employed depends in part upon the sensitivity of the instrument employed in measuring the intensity of color. For example, in qualitative determinations employing a given amount of cholesterol, more ferric perchlorate is required to give a visually-measurable color than would be required when a spectrophotometer or colorimeter is employed to measure color. The presence of the required colorimetric amount of ferric perchlorate can be ascertained by the simple procedure of mixing a small amount of cholesterol with the reagent composition, for example, about 20 micrograms of cholesterol to one milliliter of reagent. The appearance of a measurable or detectable color in the mixture as compared to the pure reagent indicates the presence of a colorimetric amount of ferric perchlorate. If less than a colorimetric amount of ferric perchlorate is employed, the colored product obtained with cholesterol can be so dilute that accurate measurement or detection of the color is impossible. In such a case, even qualitative analyses for cholesterol cannot be obtained.

In general, good results are obtained with reagent compositions containing a colorimetric amount of ferric perchlorate at concentrations of from at least aobut 0.02 percent (weight of ferric perchlorate by volume of the mixture of ester solvent and sulfuric acid) to about saturation of the mixture of ester solvent and sulfuric acid. Generally, ferric perchlorate concentrations from about 0.02 to about 0.06 percent (weight by volume) are preferred.

The liquid ingredients can be present in the reagent in approximately the percentages given below:

Sulfuric acid from about 10 to about 50 percent by volume; and

Ester solvent from about 50 to about 90 percent by volume.

When quantitative determinations are desired, the liquid ingredients are generally present as a mixture containing from about 30 to about 50 percent by volume of sulfuric acid in the ester solvent. Preferably, the percentage of the ingredients is in the following ranges:

Sulfuric acid from about 35 to about 45 percent by volume;

Ester solvent from about 55 to about 65 percent by volume; and

Ferric perchlorate from about 0.025 to about 0.035 percent (weight by volume of ester solvent and sulfuric acid).

In the qualitative or quantitative determination of cholesterol with the reagent of the invention, the reagent is mixed with a sample, generally a biological fluid or a cholesterol-containing substance such as a standard solution. In quantitative operations, the reagent is mixed with a minor amount of a biological fluid containing cholesterol. The biological fluid can be an extract, as from a tissue homogenate or the like, or it can be an animal body fluid such as blood, plasma, serum, lymphatic fluid, bile, cerebrospinal fluids or the like. The biological fluid can be employed directly as a sample or it can be treated by conventional procedures such as dilution, concentration, filtration, centrifugation, extraction or the like. For quantitative determinations, it is essential that the ferric perchlorate be employed not only in a colorimetric amount, but also in an amount which is sufficient to combine with all the cholesterol present in the ultimate mixture to form the colored product, thus providing an intensity of color proportional to the amount of cholesterol. The ultimate mixture for quantitative determinations thus comprises sulfuric acid, the ester solvent, a minor amount of cholesterol and an amount of ferric perchlorate sufficient to provide an intensity of color proportional to the amount of cholesterol. When insufficient ferric perchlorate is employed, qualitative results can be obtained, but the quantity of cholesterol in excess over that required to form the colored product is not measured. In particular applications, whether or not the colorimetric amount of ferric perchlorate employed is sufficient to provide an intensity of color proportional to the amount of cholesterol, can be determined by the simple expedient of measuring the color produced with varying amounts of cholesterol. The reagent and sample are preferably mixed to provide an excess of ferric perchlorate over that required to form the colored product to ensure that the intensity of color is limited only by cholesterol concentration and not by the concentration of ferric perchlorate. The use of such an excess of ferric perchlorate ensures that the intensity of color is proportional to the amount of cholesterol.

In determining cholesterol, the reagent is mixed thoroughly with a minor proportion of the sample, conveniently in the proportions of about one part by volume of sample to about 50 to about 250 parts by volume of reagent. The reagent and sample can be mixed in receptacles of a particular predetermined optical density or absorbance such as the tubes and cuvets conventionally employed with colorimeters or spectrophotometers, if desired. The reagent and cholesterol combine at room temperature to form a colored product with a depth of color proportional to the amount of cholesterol. Qualitative or quantitative determinations of cholesterol can be made within a short time after mixing, usually in less than about thirty minutes.

Color development is more rapid if the mixture of reagent and sample is heated for a short time. Accordingly, for rapid qualitative results, the mixture can be heated to a temperature of from about 55° to about 100° C. within about five minutes after mixing. The mixture should then be cooled to a temperature below the stated range. The exact temperature and time for heating are not critical when only qualitative determinations are desired. However, the quantitative accuracy of the method of the invention is greatly enhanced by controlling the time and temperature.

Over-heating of the mixture can partially destroy the colored product and impair the accuracy of quantitative results. Also, when the mixture is heated to temperatures substantially in excess of about 80° C. for substantial periods of time, bilirubin, gamma globulin, hemoglobin and the like which may be present in the sample of biological fluid can interfere with accurate quantitative measurement of cholesterol. Thus, for rapid quantitative procedures, the mixture can be heated to a temperature between about 58° and about 80° C. in from about one to two minutes after heating is begun, and the mixture can then be cooled to a temperature below the above-stated temperature range within about three to about five minutes after heating has ceased.

The heating step can be conveniently carried out by placing tubes containing the mixture of reagent and sample in a conventional tube heating block at a temperature of 100° C. for from one to two minutes. In a convenient procedure for cooling the mixture, the tubes are removed from the heating block and immersed in a cold water bath for from three to five minutes. Other conventional means for heating and cooling the tubes can be employed such as hot water or oil baths, ice baths and the like.

The color of the mixture can be measured by any means which will give an accurate measurement of the intensity of color. Preferably, a spectrophotometer or a colorimeter is employed. When the method is carried out in a colorimeter or spectrophotometer tube or cuvet, the mixture can then be placed in the instrument and its absorbance or transmittance determined. Otherwise, an aliquot portion of the mixture can be placed in such a tube and the intensity of color is determined on a colorimeter or spectrophotometer. In such operations, it is preferred to determine the absorbance or percent transmittance of the sample with light having a wavelength between about 555 millimicrons and 600 millimicrons. The amount of cholesterol present in the sample can then be determined by a comparison of the percent transmittance or absorbance observed for the sample with the measurements obtained when samples containing known amounts of cholesterol are employed, or with conversion charts or tables prepared from such data.

In making the colorimeter or spectrophotometer determinations, it is desirable to employ the readings obtained on the color reagent alone and in the absence of any cholesterol and to thus measure the difference in absorbance (optical density) or percent transmittance between the sample and the pure reagent (reagent blank).

It is also desirable to employ a cholesterol standard when employing the reagent of the invention to determine the amount of cholesterol present in a sample of biological fluid. In this procedure, a standard sample is prepared to contain a known amount of cholesterol and this sample is mixed with the reagent in the same predetermined proportions and treated in the identical procedure as the sample of biological fluid containing an unknown amount of cholesterol. The simultaneous use of a cholesterol standard substantially eliminates the effect of procedural deviations. The employment of the standard also permits the calculation of cholesterol concentration in the sample of biological fluid by comparison of the readings obtained with the standard and the sample.

In a convenient procedure, each sample or group of samples to be analyzed, a cholesterol standard sample and a reagent blank composition comprising the reagent alone are treated simultaneously. Additional biological fliud sample tubes can be prepared, so long as all tubes can be heated and cooled at the same temperatures simultaneously. The intensity of color for the cholesterol standard and the sample tubes is then measured, taking account of the reagent blank, and the concentration of cholesterol in the sample is obtained by comparing the intensity of color in the sample tube with the intensity of color produced by the known concentration of cholesterol in the cholesterol standard.

DESCRIPTION OF THE PREFERRED EMBODIMENTS

The following examples illustrate the present invention but are not to be construed as limiting the same.

EXAMPLE 1

520 milligrams of ferric perchlorate salt composition are dissolved in 600 milliliters of ethyl acetate at room temperature and the solution is mixed well. The salt composition has a ferric perchlorate content of about 57 percent by weight. The mixture is cooled in an ice bath while 400 milliliters of concentrated sulfuric acid are added portionwise to the mixture, the mixture being thoroughly mixed after the addition of each portion. The reagent is stable and gives excellent results in the determination of cholesterol in biological fluids.

Other reagent compositions can be similarly prepared in accordance with the procedure described above by employing an ester solvent such as methyl butyrate, propyl formate, isobutyl formate, ethyl pentanoate, pentyl acetate, isobutyl acetate, pentyl butyrate or ethyl isobutyrate in lieu of the ethyl acetate.

For example, in substantially the same procedure as described above, a reagent composition is prepared by dissolving 20 milligrams of ferric perchlorate in 70 milliliters of ethyl formate and mixing the solution thoroughly with 30 milliliters of sulfuric acid.

In substantially the same procedure, a reagent composition is prepared by dissolving 30 milligrams of ferric perchlorate in 55 milliliters of isopentyl acetate, chilling the resulting solution and mixing the solution thoroughly with 45 milliliters of sulfuric acid.

In substantially the same procedure, a reagent composition is prepared by dissolving 25 milligrams of ferric perchlorate in 70 milliliters of methyl propionate and mixing the solution thoroughly with 30 milliliters of sulfuric acid.

In substantially the same procedure, 620 milligrams of a ferric perchlorate salt composition are dissolved in 600 milliliters of ethyl butyrate. The salt composition has a ferric perchlorate content of about 64.5 percent by weight. The solution is chilled in an ice bath and 400 milliliters of sulfuric acid are mixed therewith to prepare a reagent composition.

In substantially the same procedure, 72 milligrams of a ferric perchlorate salt composition are dispersed in 65 milliliters of ethyl propionate. The salt composition has a ferric perchlorate content of about 78 percent by weight. The mixture is then chilled in an ice bath and 35 milliliters of sulfuric acid are mixed therewith to prepare a reagent composition.

In substantially the same procedure, 620 milligrams of a ferric perchlorate salt composition are dissolved in 600 milliliters of butyl acetate. The salt composition has a ferric perchlorate content of about 60.5 percent by weight. The solution is chilled in an ice bath and 400 milliliters of sulfuric acid are mixed therewith to prepare a reagent composition.

EXAMPLE 2

In a procedure similar to that employed in Example 1, a reagent composition is prepared by dissolving about 0.715 part by weight of a ferric perchlorate salt composition in 421.4 parts by weight of ethyl acetate. The salt composition employed has a ferric perchlorate content of 56 percent by weight. The solution is then cooled in an ice bath while 578.2 parts by weight of concentrated sulfuric acid are added thereto portionwise. The resulting reagent contains about 0.04 percent by weight of ferric perchlorate. The reagent composition is stable and gives excellent results in the determination of cholesterol.

EXAMPLE 3

Ferric perchlorate (1.040 grams) is dissolved in 1200 milliliters of ethyl acetate and the resulting solution is cooled in an ice bath. 800 milliliters of concentrated sulfuric acid are then added slowly to the chilled solution with stirring. 5.0 milliliters of the reagent thus prepared are then placed in each of the three photometer tubes, A, B and C. 50 microliters of serum containing an unknown amount of cholesterol are added to tube A. 0.050 milliliter of a solution containing 200 milligrams of cholesterol in 100 milliliters of glacial acetic acid is added to tube B to provide a cholesterol standard. No serum or cholesterol solution is added to tube C and tube C is employed as a reagent blank. The mixtures in tubes A and B are mixed thoroughly by shaking twenty times (about 10 seconds). All three tubes are then simultaneously placed in a heating block set at 100° C. and heated for 1.5 minutes, at which time the temperature in each tube is approximately 70° C. The tubes are then removed simultaneously and immersed in a cold water bath for three minutes, during which time the temperature of the contents of each tube is lowered to about 25° C. The tubes are then removed from the water, dried and the contents of each tube are mixed by inverting the tube. Tube C is placed in a colorimeter with a filter for light having a wavelength of 595 millimicrons. The indicating device on the colorimeter is set at zero absorbance for tube C. The absorbances of tubes A and B are then read on the colorimeter and recorded. The concentration of cholesterol in the sample in milligrams of cholesterol per 100 milliliters of sample is calculated by multiplying the absorbance of the sample by 200 and dividing the product by the absorbance of the cholesterol standard.

The same procedure described above is carried out with a freshly-prepared reagent composition and with an identical reagent composition which has been held for four weeks at room temperature. The results obtained with the aged reagent are not found to differ significantly from the results obtained with the freshly-prepared composition.

EXAMPLE 4

Determinations of serum cholesterol are made with the reagent and method of the invention on thirty different samples of serum. 5.0 milliliters of the reagent of Example 1, comprising a colorimetric amount of ferric perchlorate dispersed in ethyl acetate and sulfuric acid, are placed in each of three tubes, A, B and C. 0.05 milliliter of serum sample containing an unknown amount of cholesterol is added to tube A. A standard solution containing 200 milligrams of cholesterol per 100 milliiters of glacial acetic acid solvent is prepared. 0.05 milliliter of this standard solution is added to tube B to provide a cholesterol standard. No serum or cholesterol solution is added to tube C and tube C is employed as a reagent blank. The mixture in tubes A and B is mixed thoroughly by shaking for at least ten seconds. All three tubes are then simultaneously placed in a heating block set at 100° C. and heated for exactly 1.5 minutes at which time the temperature in each tube is approximately 70° C. The tubes are then removed simultaneously and immersed in water having a temperature not higher than 20° C. for five minutes, during which time the temperature of the contents of each tube is lowered to about 20° to 28° C. The tubes are then removed from the water, dried and the contents of each tube are mixed by inverting the tube. The contents of tube C are placed in a spectrophotometer cuvet and the cuvet is placed in a Beckman DU spectrophotometer with a wavelength setting at 560 millimicrons. The indicating device on the spectrophotometer is set at zero absorbance for tube C. The absorbance of the contents of tubes A and B is then read on the spectrophotometer and recorded. The concentration of cholesterol in the sample A in milligrams of cholesterol per 100 milliliters of sample is calculated by multiplying the absorbance of the sample A by 200 and dividing the product by the absorbance of the cholesterol standard B.

As a check, determinations of serum cholesterol are carried out on thirty serum samples identical to the samples employed above. The check determinations are carried out by the method of Abell et al. Statistical analysis of the results indicates that there is no significant difference between results obtained with the method of Abell et al. and the results obtained with the method and reagent composition of the invention.

EXAMPLE 5

The precision of the determination of cholesterol with method and reagent of Example 4 from one determination to the other is evaluated. The evaluations are carried out by making determinations on samples containing different levels of total cholesterol between 100 and 400 milligrams per 100 milliliters of sample. In these operations, thirty consecutive determinations are carried out. Statistical treatment of the data indicates excellent precision of the method from one determination to another.

EXAMPLE 6

In other determinations, the method and reagent of Example 4 are employed to compare samples of human serum containing known amounts of cholesterol with samples containing the same amount of cholesterol to which hemoglobin has been added in known amounts. No significant difference in intensity of color is observed between the serum samples and the samples containing added hemoglobin. These determinations indicate that no interference by hemoglobin is observed at concentrations of 600 milligrams of hemoglobin per 100 milliliters of sample.

EXAMPLE 7

In other determinations, serum samples containing known amounts of cholesterol are compared with samples containing the same amount of cholesterol to which known amounts of bilirubin have been added. No significant difference in results is observed between the serum samples and the samples containing additional bilirubin. These determinations indicate that no interference by bilirubin is observed at concentrations of 12 milligrams of bilirubin per 100 milliliters of serum.

EXAMPLE 8

In other determinations, the reagent and method of Example 4 are employed to compare samples containing known amounts of cholesterol with samples containing the same amount of cholesterol to which gamma globulin has been added in known amounts. The results obtained with the two sets of samples are substantially identical. These determinations indicate that no interference by gamma globulin is observed at concentrations of 6 grams of gamma globulin per 100 milliliters of sample.

EXAMPLE 9

In other operations, the reagent and analytical method of Example 4 are employed in the determination of cholesterol in samples containing abnormally high percentages of cholesterol esters. The determinations are carried out on serum samples containing cholesterol esters such as cholesteryl palmitate, cholesteryl stearate and cholesteryl oleate at concentrations of from about 80 to about 91 percent of the total cholesterol, as compared with the cholesterol ester content in normal serum of about 70–78 percent of total cholesterol. Determinations of cholesterol are carried out by the method of Abell et al. on duplicate samples to serve as a check. In these operations, the reagent and method of the invention are found to give substantially the same results as the check method of Abell et al.

What is claimed is:

1. A composition useful for the determination of cholesterol comprising a colorimetric amount of ferric perchlorate dispersed in a mixture containing from about 10 to about 50 percent by volume of sulfuric acid in a lower alkyl ester of a lower alkanoic acid.

2. The composition of claim 1 wherein the mixture contains from about 30 to 50 percent by volume of sulfuric acid in a lower alkyl ester of a lower alkanoic acid.

3. The composition of claim 2 wherein the ferric perchlorate is present in the amount of at least about 0.02 percent by weight per volume of the mixture.

4. The composition of claim 1 wherein the ester is ethyl acetate.

5. The composition of claim 4 wherein the ferric perchlorate is present in an amount of from about 0.02 to about 0.04 percent by weight per volume of the mixture.

6. The composition of claim 1 further comprising a biological fluid.

7. The composition of claim 6 wherein the ester is ethyl acetate.

8. A composition comprising cholesterol and a colorimetric amount of ferric perchlorate dispersed in a mixture containing from about 10 to about 50 percent by volume of sulfuric acid in a lower alkyl ester of a lower alkanoic acid, the colorimetric amount of ferric perchlorate being sufficient to provide an intensity of color proportional to the amount of cholesterol.

9. The composition of claim 8 wherein the ester is ethyl acetate.

10. A method comprising:
    (a) mixing a minor amount of a biological fluid with a reagent composition comprising a colorimetric amount of ferric perchlorate dispersed in a mixture containing from about 10 to about 50 percent by volume of sulfuric acid in a lower alkyl ester of a lower alkanoic acid;
    (b) heating the resulting mixture to a temperature of from about 55° to about 100° C.; and
    (c) cooling the heated mixture.

11. The method of claim 10 wherein the mixture is heated to a temperature of from about 58° to about 80° C. in from about 1 to 2 minutes.

References Cited

Zlatkis et al.: J. Lab. Clin. Med., 1953, vol. 41, pp. 486–492.

JOHN T. GOOLKASIAN, Primary Examiner

M. E. McCAMISH, Assistant Examiner

U.S. Cl. X.R.

23—230